United States Patent
Lee (10) Patent No.: US 7,498,789 B2
(45) Date of Patent: Mar. 3, 2009

(54) SWITCHING REGULATOR WITH OVER-CURRENT PROTECTION

(75) Inventor: Ming-Han Lee, Hsin Tien (TW)

(73) Assignee: Realtek Semiconductor Corp., Hsinchu (TW)

( * ) Notice: Subject to any disclaimer, the term of this patent is extended or adjusted under 35 U.S.C. 154(b) by 183 days.

(21) Appl. No.: 11/516,538

(22) Filed: Sep. 7, 2006

(65) Prior Publication Data

US 2007/0057654 A1    Mar. 15, 2007

(30) Foreign Application Priority Data

Sep. 9, 2005    (TW) .............................. 94130997 A (51) Int. Cl.
*G05F 1/56*    (2006.01)

(52) U.S. Cl. ...................................... 323/283; 323/284
(58) Field of Classification Search ................. 323/282, 323/283, 284, 285
See application file for complete search history.

(56) References Cited

U.S. PATENT DOCUMENTS

| 5,694,029 A | | 12/1997 | Hayes et al. | |
|---|---|---|---|---|
| 6,163,142 A | * | 12/2000 | Tsujimoto | 323/283 |
| 6,492,794 B2 | * | 12/2002 | Hwang | 323/285 |
| 7,084,612 B2 | * | 8/2006 | Zinn | 323/266 |
| 7,132,818 B2 | * | 11/2006 | Matsuura | 323/222 |
| 7,199,568 B2 | * | 4/2007 | Matsuo et al. | 323/283 |
| 7,218,080 B2 | * | 5/2007 | Yang | 323/222 |
| 7,218,088 B2 | * | 5/2007 | Ito | 323/351 |
| 7,301,312 B2 | * | 11/2007 | Nishino | 323/222 |
| 2007/0279028 A1 | * | 12/2007 | Lee | 323/284 |

FOREIGN PATENT DOCUMENTS

TW           588489        5/2004

* cited by examiner

*Primary Examiner*—Jeffrey L Sterrett
(74) *Attorney, Agent, or Firm*—Muncy, Geissler, Olds & Lowe, PLLC (57) ABSTRACT

A switching regulator with over-current protection is disclosed. The invention comprises an error amplifier, a pulse width modulator, an over-current protection unit, a gate driver, a tank circuit and a load. According to the invention, the variation of the output current outside a chip is detected and controlled by monitoring the voltage level of the error signal for over-current protection, thus reducing power dissipation caused by an additive resistor and raising efficiency of voltage conversion.

9 Claims, 9 Drawing Sheets

SWITCHING REGULATOR WITH OVER-CURRENT PROTECTION

This application claims the benefit of the filing date of Taiwan Application Ser. No. 094130997, filed on Sep. 9, 2005, the content of which is incorporated herein by reference.

BACKGROUND OF THE INVENTION

1. Field of the Invention

The present invention generally relates to a switching regulator and, more specifically to a switching regulator with over-current protection.

2. Description of the Related Art

Figure 1:
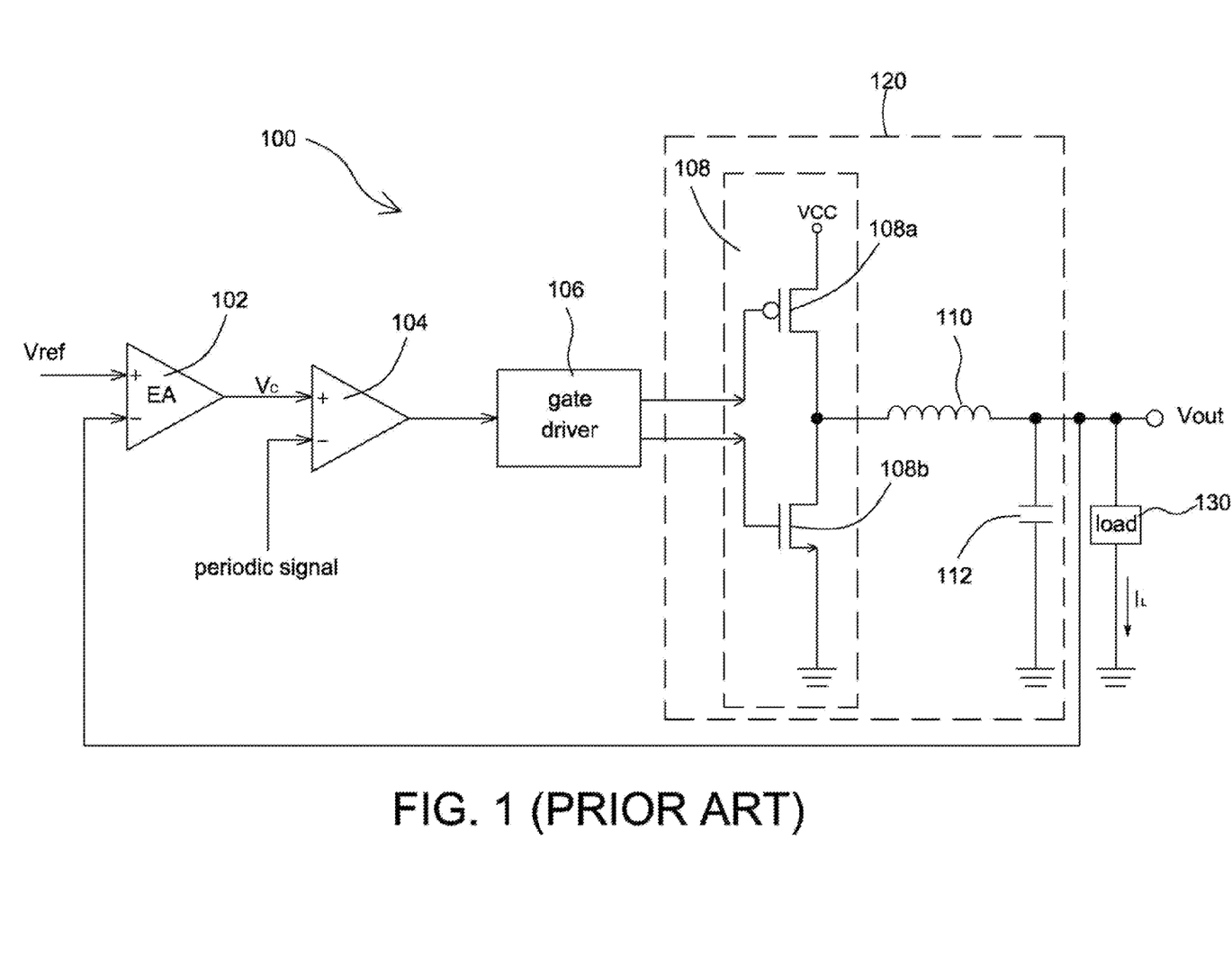
FIG. 1 is a block diagram illustrating a switching regulator according to the prior art.

By setting various switching times of power circuits, switching regulators can provide different output voltages and currents. FIG. 1 is a block diagram illustrating a switching regulator according to the prior art. Referring to FIG. 1, a conventional switching regulator 100 comprises an error amplifier 102, a pulse width modulator 104, a gate driver 106, a tank circuit 120 and a load 130. The operation principle of the switching regulator is based on comparison of an output voltage $V_{out}$ and a reference level voltage $V_{ref}$ for controlling the switching times of both transistor switches 108a, 108b in a switching circuit 108, thereby stabilizing the output voltage of the circuit. While the output voltage $V_{out}$ is smaller than the reference level voltage $V_{ref}$, the switch 108a is turned on and the switch 108b is turned off. This furnishes a path for the electrical energy stored in a commutating inductor 110 and an output capacitor 112, and thus the output voltage $V_{out}$ is stepped up. Conversely, the switch 108a is turned off and the switch 108b is turned on while the output voltage $V_{out}$ greater than the reference level voltage $V_{ref}$. Accordingly, the commutating inductor 110 discharges and the magnetic field surrounding the coil within the output capacitor 112 starts to collapse, and thus the output $V_{out}$ is stepped down.

Figure 2A:
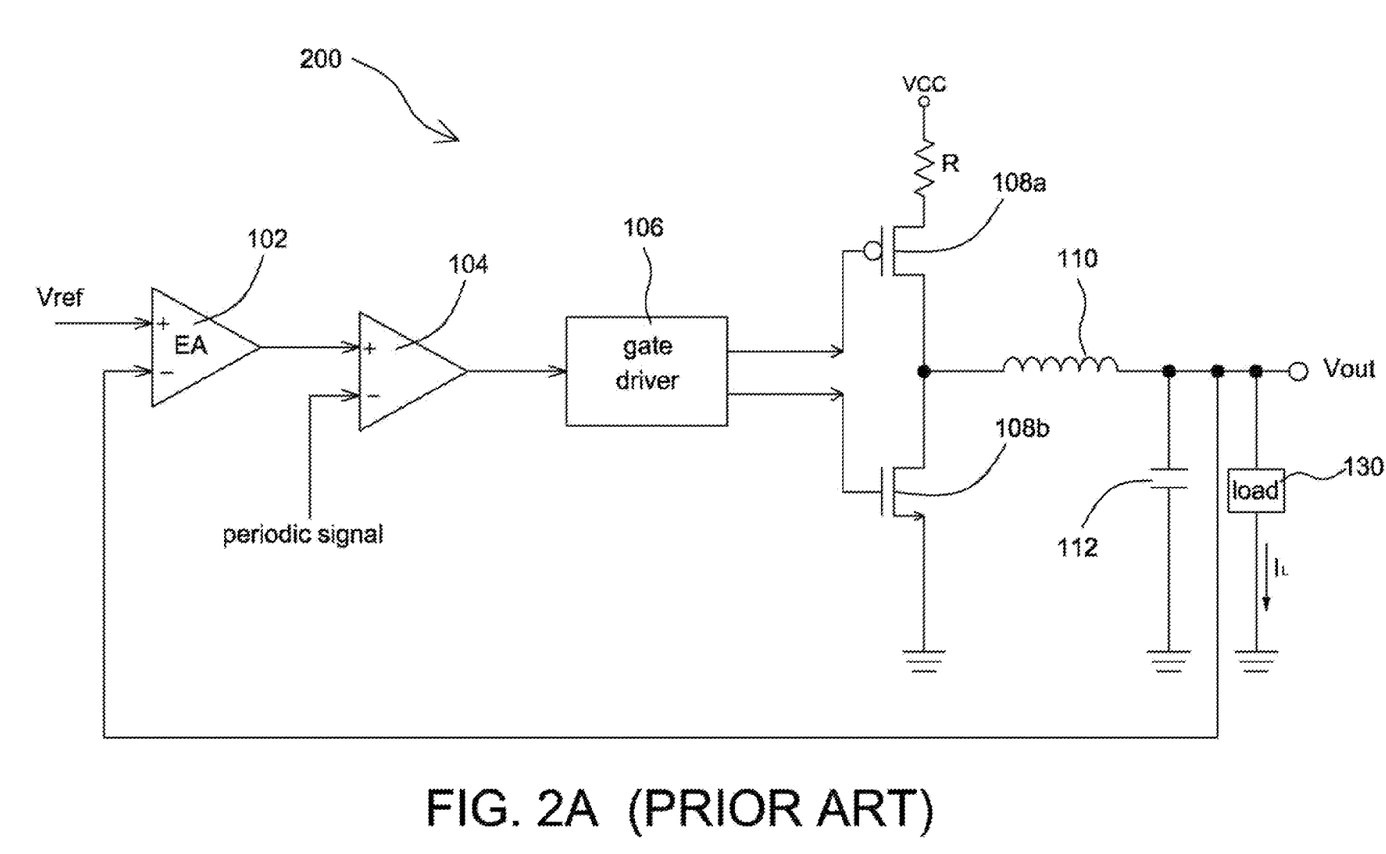
FIGS. 2A, 2B are two different block diagrams illustrating the switching regulator shown in FIG. 1 with an additional resistor.
Figure 2B:
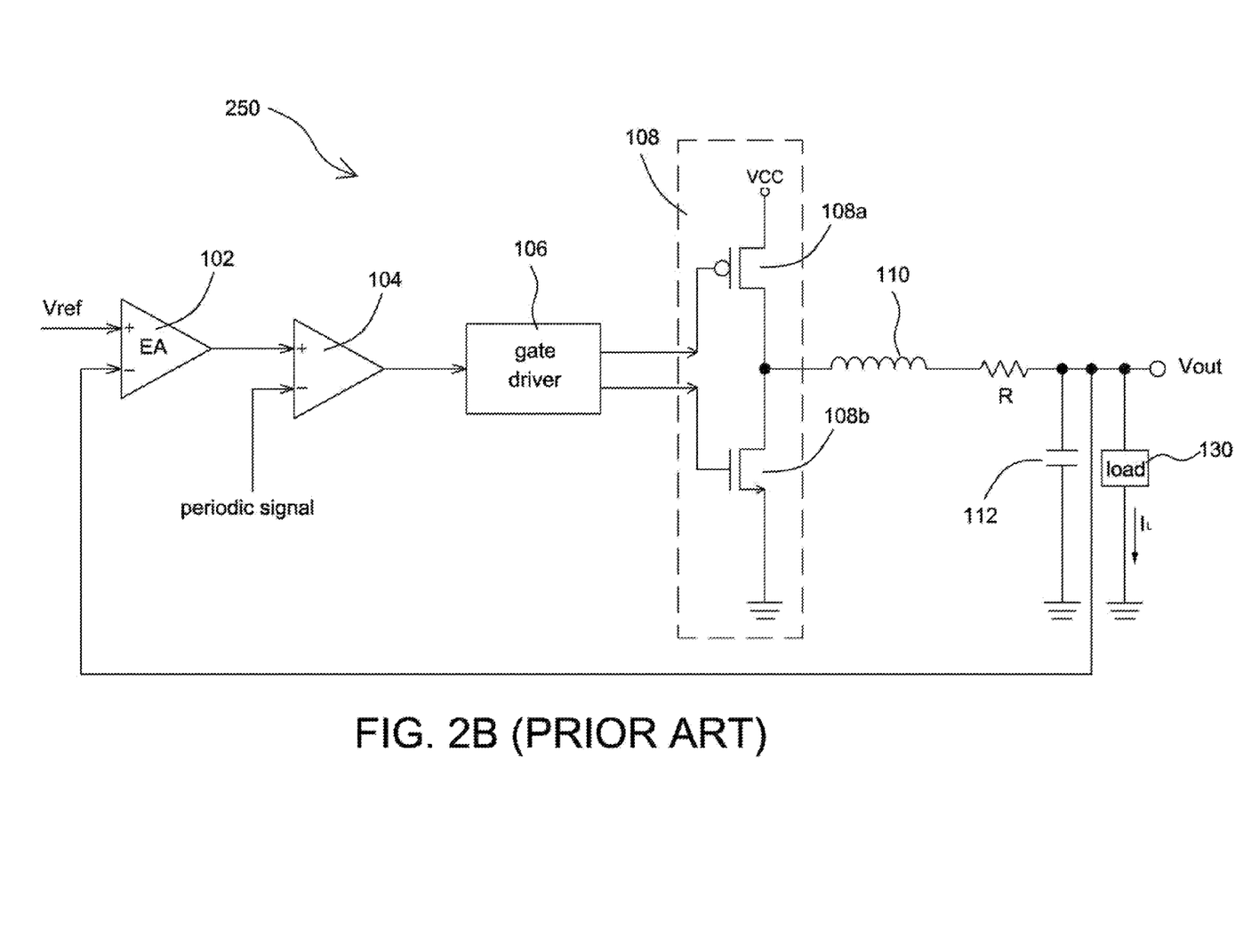

In general, a control method is often used in the conventional switching regulator 100 by comparing an error signal $V_C$ outputted from the error amplifier 102 and a voltage level of triangular waveforms (periodic signals), directly or indirectly, so as to determine the turning-on time for each of switches 108a, 108b. That is, a duty cycle of a driving signal for controlling switches 108a, 108b is varied using a so-called pulse width modulation. In other words, the longer the turning-on time (duty cycle of the driving signal) for switch 108a and the shorter the turning-on time for switch 108b, the greater the current $I_L$ for the load 130. Contrarily, the shorter the turning-on time (duty cycle of the driving signal) for switch 108a and the longer the turning-on time for switch 108b, the smaller the current $I_L$ for the load 130. FIGS. 2A, 2B are two different block diagrams illustrating the switching regulator shown in FIG. 1 with an additional resistor. To prevent the output current $I_L$ from exceeding the limit of circuit capacity, a resistor R is added to either a source of the PMOS transistor 108a (shown in FIG. 2A) or the current path of the commutating inductor 110 (shown in FIG. 2B) in a conventional switching regulator 200 (250). The current flowing through the source of the PMOS transistor 108a is calculated by measuring the voltage over the resistor R, therefore monitoring the output current. However, there are two drawbacks for the previously discussed current measuring methods for the switching regulator with an added resistor as follows. Firstly, due to low output voltage and high current flow features, the switching regulator can not be equipped with a resistor R having a very large resistance value, or a lot of power will be dissipated, resulting in reduced efficiency of conversion. Secondly, since the current running through the source of the switch 108a is not a DC current, the output current need to be derived from peak currents.

SUMMARY OF THE INVENTION

In view of the above-mentioned problems, an object of the invention is to provide a switching regulator with over-current protection.

Another object of the invention is to provide a regulating method of generating an output voltage with over-current protection.

To achieve the above-mentioned object, the switching regulator with over-current protection of the invention comprises a tank circuit for receiving and converting a driving signal into an output voltage and an output current, a first comparator for comparing a reference level voltage and the output voltage, and then generating an error signal, a second comparator for comparing the error signal and a periodic signal, and then generating a pulse signal, an over-current protection unit for enabling a control signal, and a gate driver for generating the driving signal in accordance with the pulse signal and the control signal.

In a preferred embodiment of the invention, the over-current protection unit generates the control signal according to the error signal and the predetermined voltage.

According to another preferred embodiment of the invention, there is provided a regulating method with over-current protection at a switching regulator. The switching regulator is employed to generate an output voltage. The method includes the steps of comparing the output voltage and a reference level voltage to generate an error signal; comparing the error signal and a periodic signal to generate a pulse signal, and comparing the error signal and a predetermined voltage to enable the control signal; generating a driving signal in accordance with the pulse signal and the control signal; and generating the output signal in accordance with the driving signal.

DETAILED DESCRIPTION OF THE INVENTION

The switching regulator with over-current protection of the invention will be described with reference to the accompanying drawings.

Figure 3:
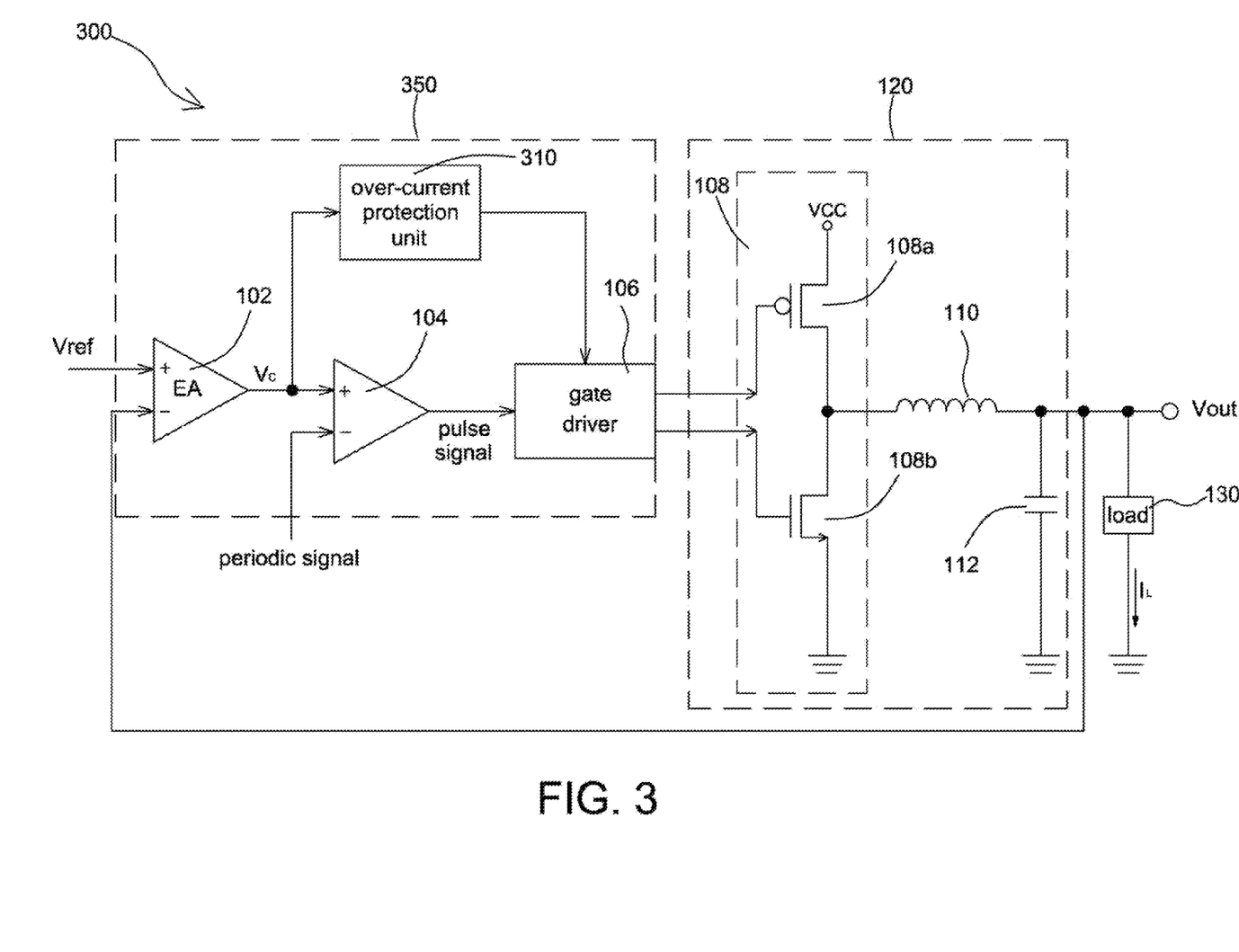
FIG. 3 is a block diagram illustrating a switching regulator with over-current protection according to the invention.

FIG. 3 is a block diagram illustrating a switching regulator with over-current protection according to the invention. A switching regulator 300 with over-current protection comprises an error amplifier 102, a pulse width modulator 104, an over-current protection unit 310, a gate driver 106, a tank circuit 120 and a load 130.

The first error amplifier 102 generates an error signal $V_C$ after comparing a reference level voltage $V_{ref}$ and an output voltage $V_{out}$. Thus, the duty cycle of the pulse signal outputted from the pulse width modulator 104 is varied with respect to different amplitudes of the error signal $V_C$. Based on comparison of the error signal $V_C$ and a periodic signal, the pulse width modulator 104 generates a pulse signal. After comparing the error signal $V_C$ and a predetermined voltage $V_S$ and then determining that the switching regulator 300 is in an over-current state, the over-current protection unit 310 enables a control signal to control the operations of the gate driver 106. That is, the switch 108a. is turned off by the gate driver 106 in order to reduce an output current $I_L$. The gate driver 106 generates a driving signal to control switches 108a, 108b in accordance with the pulse signal and the control signal. Since the method of controlling switches 108a, 108b in accordance with the pulse signal is well known, the description is omitted here. Lastly, the tank circuit 120 receives the driving signal for converting the driving signal into the output voltage $V_{out}$ and the output current $I_L$.

Wherein, the pulse width modulator 104 provides a series of pulse signals of fixed frequency and voltage level, but which may vary in duty cycle to modify the output current $I_L$ flowing through the load 130, thus stabilizing the output voltage $V_{out}$.

Figure 4A:
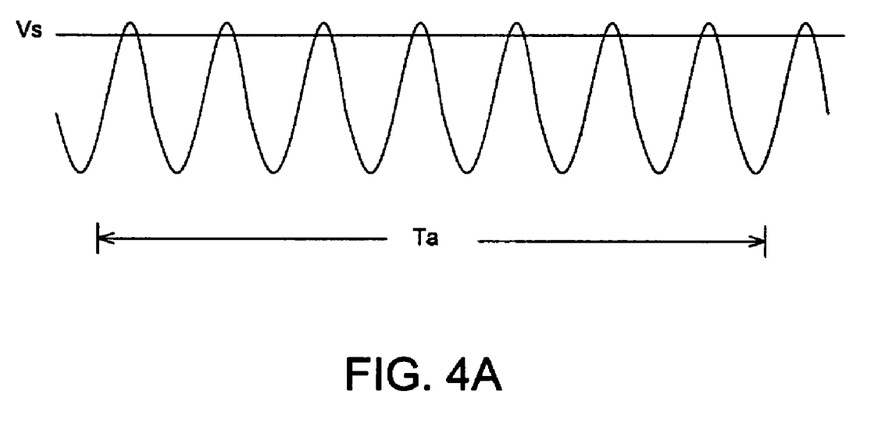
FIGS. 4A and 4B show two over-current situations for the switching regulator 300.
Figure 4B:
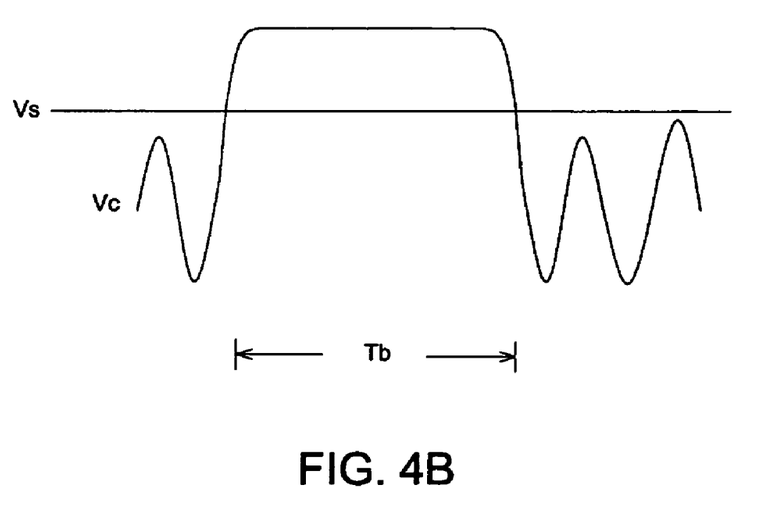

FIGS. 4A and 4B show two over-current situations for the switching regulator 300. First, as shown in FIG. 4A, the number of times that the voltage of the error signal rises above the predetermined voltage $V_S$ within a predetermined time period (e.g. Ta>=160 μs) is greater than a first threshold value (e.g. seven). This implies that the output current $I_L$ may exceed the upper limit of the specified range designed for a normal load current. Wherein, the predetermined voltage $V_S$ is determined based on the normal load current of the designed circuit. In other words, the predetermined voltage $V_S$ is capable of being adjusted in accordance with different loads of the switching regulator 300. As for the other over-current situation shown in FIG. 4B, the time period that the voltage level of the error signal $V_C$ stays above the predetermined voltage extends too long (e.g. Tb>=70 μs). This implies that the output current $I_L$ may continuously exceed the upper limit of the specified range designed for a normal load current within this time period. Besides, the turning-on time for the switch 108a is too long. It seems that a short circuit occurs.

In the preferred embodiment shown in FIG. 3, the error amplifier 102, the pulse width modulator 104, the over-current protection unit 310 and the gate driver 106 are embedded on a control chip 350. In an alternate embodiment, the control chip 350 may include the switching circuit 108.

Figure 5:
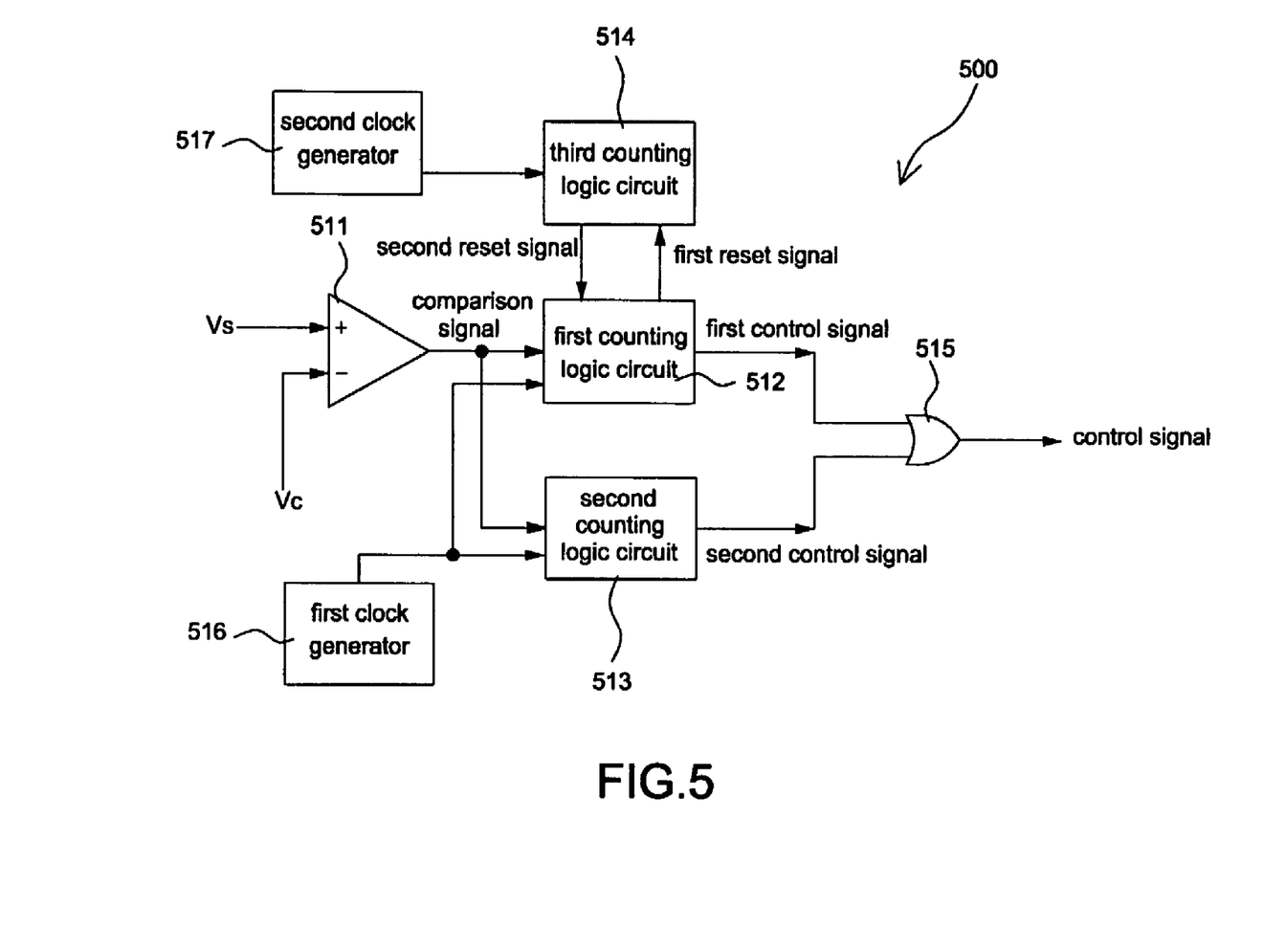
FIG. 5 is a block diagram showing an over-current protection unit according to the invention.

FIG. 5 is a block diagram showing an over-current protection unit according to the invention. An over-current protection unit 500 comprises a third comparator 511, a first counting logic circuit 512, a second counting logic circuit 513, a third counting logic circuit 514 and an OR gate 515. The third comparator 511 compares the error signal $V_C$ and the predetermined voltage $V_S$ so as to generate a comparison signal. In turn, after receiving the comparison signal, the first counting logic circuit 512 accumulates a number of times that the voltage of the error signal $V_C$ rises above the predetermined voltage $V_S$ (shown in FIG. 4A), and then enables a first control signal if the number of times is greater than a first threshold value. Meanwhile, whenever the voltage of the error signal $V_C$ is greater than the predetermined voltage $V_S$, the first counting logic circuit 512 also provides a first reset signal to reset the third counting logic circuit 514. The third counting logic circuit 514 counts for a time period $T_2$ and then generates a second reset signal to reset the first counting logic circuit 512 if the time period $T_2$ is greater than a third threshold value. Upon receiving the first reset signal, the third counting logic circuit 514 is reset and restarted to count for the time period $T_2$.

Continuing, referring to FIG. 5, the second counting logic circuit 513 also receives the comparison signal and counts for a time period $T_1$ that the voltage of the error signal $V_C$ stays above the predetermined voltage $V_S$, whenever the voltage of the error signal $V_C$ is greater than the predetermined voltage $V_S$. Consequently, the second counting logic circuit 513 enables a second control signal if the time period $T_1$ is greater than a second threshold value. Next, after receiving either the first control signal or the second signal, the OR gate 515 generates a control signal to control operations of the gate driver 106, allowing the gate driver 106 to generate a driving signal for turning off the switch 108a and reducing the output current $I_L$.

Wherein, the purpose for installing the third counting logic circuit 514 is to make the operations of the first counting logic circuit 512 more accurate. For example, a time gap between two successive occurrences that the voltage of the error signal $V_C$ is greater than the predetermined voltage $V_S$ is longer than a predetermined time period (e.g. the above-mentioned third threshold value), the third counting logic circuit 514 provides a second reset signal to reset the first counting logic circuit 512, and thus the counter in the first counting logic circuit 512 is reset to zero and restarted.

In the previously discussed embodiments, the inputs of the first counting logic circuit 512, the second counting logic circuit 513, the third counting logic circuit 514 are connected to two clock generators having two different frequencies. For example, a first clock generator 516, connected to the inputs of the first counting logic circuit 512 and the second counting logic circuit 513, provides a series of first clock pulses at a fixed frequency of 100 KHz while a second clock generator 517, connected to the input of the third counting logic circuit 514, provides a series of second clock pulses at a fixed frequency of 1 MHz.

Each embodiment of the invention can be embedded on the chip 350 where the variation of the output current $I_L$ outside the chip 350 is detected and controlled by monitoring the voltage level of the error signal $V_C$. Besides, the predetermined voltage $V_S$ can be directly set or adjusted inside the control chip 350, which is applicable to devices with modulated voltages.

Figure 6:
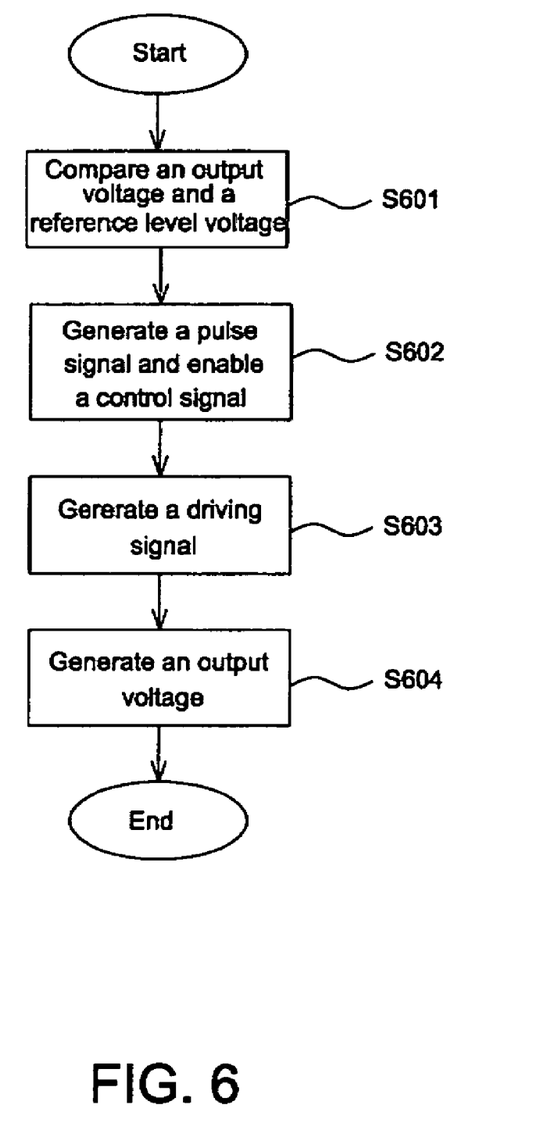
FIG. 6 is a flow chart illustrating the regulating method with over-current protection according to the invention.

FIG. 6 is a flow chart illustrating the regulating method with over-current protection according to the invention. The regulating method with over-current protection of the invention is used in a switching regulator. The switching regulator is employed to generate an output voltage $V_{out}$. The method in accordance with FIG. 6 is detailed as follows.

Step 601: Compare the output voltage $V_{out}$ and a reference level voltage $V_{ref}$ to generate an error signal $V_C$.

Step 602: Compare the error signal $V_C$ and a periodic signal to generate a pulse signal. Meanwhile, compare the error signal $V_C$ and the predetermined voltage $V_S$ to enable a control signal Step 603: Generate a driving signal according to the pulse signal and the control signal.

Step 604: Generate the output signal according to the driving signal.

Wherein, at step 604, the control signal is enabled to control the operations of the gate driver 106 such that the switch 108a is turned off for reducing the output current $I_L$ if a number of times that the voltage level of the error signal $V_C$ rises above the predetermined voltage $V_S$ is greater than a first threshold value, or a time period that the voltage level of the error signal $V_C$ stays above the predetermined voltage is greater than a second threshold value.

Figure 7:
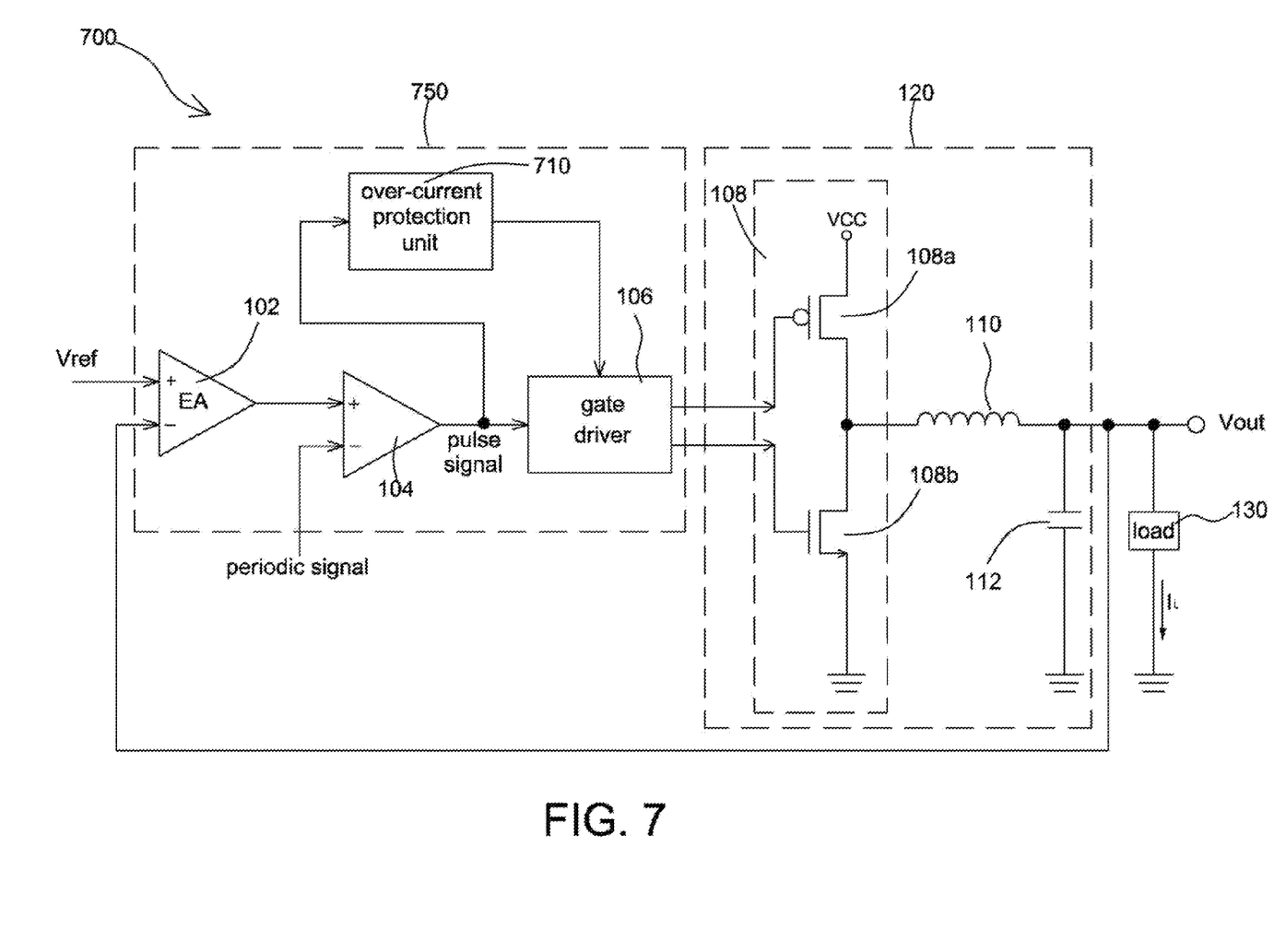
FIG. 7 is a block diagram of a switching regulator with over-current protection according to another embodiment of the invention.

FIG. 7 is a block diagram of a switching regulator with over-current protection according to another embodiment of the invention. Referring to FIG. 7, based on comparison of the switching regulator 300 in FIG. 3 and the switching regulator 700 in FIG. 7, the most important difference is that an over-current protection unit 710 enables the control signal with respect to the pulse signal outputted from the pulse width modulator 104. In turn, the enabled control signal triggers the gate driver 106 to generate the driving signal, thus controlling the switches 108a, 108b. In this embodiment, the over-current protection unit 710 measures the pulse width of the pulse signal outputted from the pulse width modulator 104 and then determines whether to enable the control signal or not. The counter in the over-current protection unit 710 begins to count if the pulse width of the pulse signal is greater than a predetermined pulse width (e.g. 800 ns). Afterwards, if the counted value of the counter in the over-current protection unit 710 is greater than a fourth threshold value within a predetermined time period, the over-current protection unit 710 enables the control signal to trigger the gate driver 106 for generating the driving signal. Therefore, the output current $I_L$ is decreased as the switch 108a is switched off.

Figure 8:
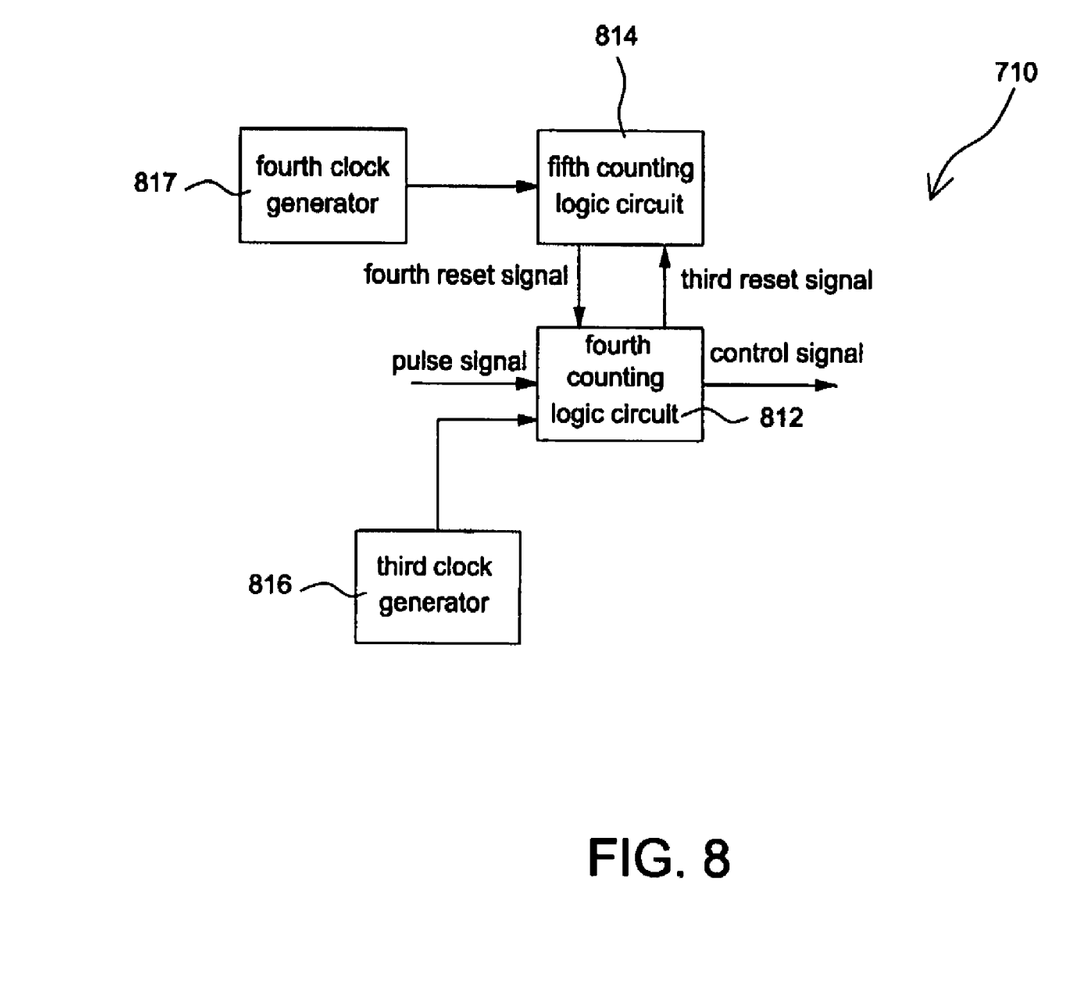
FIG. 8 provides an exemplary illustration of the over-current protection unit shown in FIG. 7.

FIG. 8 provides an exemplary illustration of the over-current protection unit 710 shown in FIG. 7. Referring to FIG. 8, a fourth counting logic circuit 812 receives the pulse signal and counts in units of clock pulses generated by a third clock generator 816 whenever the pulse width of the pulse signal is greater than a predetermined pulse width. Then, the fourth counting logic circuit 812 enables and outputs the control signal to the gate driver 106 if the counted value is greater than a fourth threshold value. In addition, whenever the counted value is incremented, the fourth counting logic circuit 812 also generates a third reset signal to reset a fifth counting logic circuit 814. The fifth counting logic circuit 814 counts for a time period $T_3$ in units of clock pulses generated by a fourth clock generator 817. The fourth clock generator 817 generates a fourth reset signal to reset a fourth counting logic circuit 812 if the time period $T_3$ is greater than a fifth threshold value. Next, Upon receiving the third reset signal, the fifth counting logic circuit 814 is reset and restarted to count for the time period $T_3$.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A switching regulator with over-current protection, comprising:
    a tank circuit for receiving and converting a driving signal into an output voltage and an output current;
    a first comparator for comparing a reference level voltage and the output voltage, and then generating an error signal;
    a second comparator for comparing the error signal and a periodic signal and then generating a pulse signal;
    an over-current protection unit counting a number of times that the voltage of the error signal rises above a predetermined voltage, and enabling a control signal if the number of times is greater than a predetermined value; and
    a gate driver for generating the driving signal in accordance with the pulse signal and the control signal.

2. The switching regulator as claimed in claim 1, wherein the over-current protection unit comprises:
    a third comparator for comparing the error signal and the predetermined voltage, and then generating a comparison signal; and
    a first counting logic circuit for receiving the comparison signal to count the number of times that the voltage of the error signal rises above the predetermined voltage within a predetermined time period, and then enabling the control signal while the number of times is greater than a first threshold value.

3. The switching regulator as claimed in claim 2, wherein the over-current protection unit further comprises:
    a second counting logic circuit for receiving the comparison signal to count a time period that the voltage of the error signal stays above the predetermined voltage, and then enabling the control signal while the time period is greater than a second threshold value.

4. The switching regulator as claimed in claim 2, wherein the over-current protection unit further comprises:
    a third counting logic circuit for counting the predetermined time period, and then generating a reset signal to reset the first counting logic circuit if the counting is completed.

5. The switching regulator as claimed in claim 1, wherein the tank circuit comprises:
    a switching unit, comprising a plurality of transistors, for generating the output voltage and the output current in accordance with the driving signal;
    an inductor connected to the plurality of transistors; and
    a capacitor connected to the inductor.

6. The switching regulator as claimed in claim 1, wherein the first comparator, the second comparator, the over-current protection unit, the gate driver and the switching unit are embedded on a control chip.

7. The switching regulator as claimed in claim 1, wherein the first comparator, the second comparator, the over-current protection unit and the gate driver are embedded on a control chip.

8. A regulating method of generating an output voltage with over-current protection, comprising the steps of:
    comparing the output voltage and a reference level voltage to generate an error signal;
    comparing the error signal and a periodic signal to generate a pulse signal;
    generating a control signal by counting a number of times that the voltage of the error signal rises above the predetermined voltage within a predetermined time period, and then enabling the control signal while the number of times is greater than a first threshold value;
    generating a driving signal in accordance with the pulse signal and the control signal; and
    generating the output signal in accordance with the driving signal.

9. The switching method as claimed in claim 8, wherein the step of generating the control signal further comprises the step of:
    counting a time period that the voltage of the error signal stays above the predetermined voltage, and then enabling the control signal if the time period is greater than a second threshold value.

* * * * *